US012207329B2

(12) United States Patent
Kwon et al.

(10) Patent No.: US 12,207,329 B2
(45) Date of Patent: Jan. 21, 2025

(54) MULTI-LINK DEVICE (MLD) ASSOCIATION (71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 292 days.

(21) Appl. No.: 17/649,715

(22) Filed: Feb. 2, 2022

(65) Prior Publication Data

US 2022/0248489 A1 Aug. 4, 2022

Related U.S. Application Data (60) Provisional application No. 63/145,022, filed on Feb. 3, 2021.

(51) Int. Cl.
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 2018/0035292 A1* | 2/2018 | Soundararajan | H04W 12/06 |
| 2019/0335454 A1* | 10/2019 | Huang | H04W 72/542 |
| 2021/0029766 A1* | 1/2021 | Zhang | H04W 76/15 |
| 2021/0212142 A1* | 7/2021 | Patil | H04L 1/187 |
| 2021/0298102 A1* | 9/2021 | Kwon | H04W 48/08 |
| 2021/0314846 A1* | 10/2021 | Chu | H04W 40/244 |
| 2021/0400662 A1* | 12/2021 | Huang | H04W 72/542 |
| 2022/0046621 A1* | 2/2022 | Kandala | H04B 7/0697 |
| 2022/0124855 A1* | 4/2022 | Hu | H04W 76/34 |
| 2022/0132610 A1* | 4/2022 | Guo | H04W 76/11 |
| 2023/0217492 A1* | 7/2023 | Garcia Rodriguez | H04W 74/0816 370/329 |
| 2023/0224710 A1* | 7/2023 | Huang | H04W 12/10 726/5 |
| 2023/0319928 A1* | 10/2023 | Guo | H04W 76/11 370/328 |
| 2023/0388753 A1* | 11/2023 | Wang | H04W 72/12 |
| 2024/0073812 A1* | 2/2024 | Liu | H04W 28/0263 |
| 2024/0089730 A1* | 3/2024 | Ho | H04W 12/037 |

OTHER PUBLICATIONS

IEEE; "IEEE P 802.11 Wireless LANs: Usage and Rules of ML element in the context of Multi-link Setup"; Jan. 2021; 2 pages.

(Continued)

*Primary Examiner* — Phirin Sam (57) ABSTRACT

One example discloses a first multi-link device (MLD) within a wireless local area network (WLAN), including: a controller configured to receive a multi-link setup request for the first MLD to associate with a second MLD on a first set of PHY-layer links; wherein the controller is configured to transmit a response to the second MLD; and wherein the response associates the first MLD with the second MLD on a second set of PHY-layer links.

21 Claims, 4 Drawing Sheets

(56) References Cited

OTHER PUBLICATIONS

IEEE; "IEEE P 802.11be™ /D0.3 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 8: Enhancements for extremely high throughput (EHT)"; Jan. 2021; 389 pages.

* cited by examiner

MULTI-LINK DEVICE (MLD) ASSOCIATION

REFERENCE TO PROVISIONAL APPLICATION TO CLAIM PRIORITY

A priority date for this present U.S. patent application has been established by prior U.S. Provisional Patent Application, Ser. No. 63/145,022, entitled "Apparatus And Methods For Association In Multi-Link Wireless Communication Systems", filed on 3 Feb 2021, and commonly assigned to NXP USA, Inc.

The present specification relates to systems, methods, apparatuses, devices, articles of manufacture and instructions for multi-link device (MLD) association.

SUMMARY

According to an example embodiment, a first multi-link device (MLD) within a wireless local area network (WLAN), comprising: a controller configured to receive a multi-link setup request for the first MLD to associate with a second MLD on a first set of PHY-layer links; wherein the controller is configured to transmit a response to the second MLD; and wherein the response associates the first MLD with the second MLD on a second set of PHY-layer links.

In another example embodiment, the request is an Association or Reassociation Request frame; and the response is an Association or Reassociation Response frame.

In another example embodiment, the first device is an AP-MLD; and the second device is a non-AP-MLD.

In another example embodiment, the first set of PHY-layer links overlaps with the second set of PHY-layer links; and the second MLD considers that link setup is made only on the overlapping PHY-layer links.

In another example embodiment, the first set of PHY-layer links does not overlap with the second set of PHY-layer links; and the second MLD considers that link setup is made only on the second set of PHY-layer links.

In another example embodiment, the first set of PHY-layer links includes only a single link and the second set of PHY-layer links also includes the single link; and the second MLD considers that link setup is made only on the single link.

In another example embodiment, the first set of PHY-layer links includes a first link and the second set of PHY-layer links includes a second link that is different from the first link; and the second MLD considers that link setup is made only on the second link.

In another example embodiment, the response to the second MLD is a multi-link setup response.

In another example embodiment, the response includes a basic variant multi-link (ML) element.

In another example embodiment, the basic variant ML element does not include a Link Info field.

In another example embodiment, the basic variant ML element does not include a Per-STA profile subelement.

In another example embodiment, the basic variant ML element includes a common information field.

In another example embodiment, the basic variant ML element includes an MLD MAC address.

In another example embodiment, the response includes a capability information field outside of the basic variant ML element.

In another example embodiment, the capability information field includes a status code field and/or an AID field.

In another example embodiment, the response to the second MLD is not a multi-link setup response.

In another example embodiment, the response does not include a basic variant multi-link (ML) element.

In another example embodiment, the response does not include information on the first MLD's other link capabilities.

In another example embodiment, the request is from the second MLD.

According to an example embodiment, a method of enabling a first multi-link device (MLD) within a wireless local area network (WLAN) to be operated, comprising: distributing a set of instructions, stored on a non-transitory, tangible computer readable storage medium, for configuring the first multi-link device (MLD); wherein the instructions include: receiving a multi-link setup request for the first MLD to associate with a second MLD on a first set of PHY-layer links; transmitting a response to the second MLD; and associating the first MLD with the second MLD on a second set of PHY-layer links.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

IEEE (Institute of Electrical and Electronics Engineers) 802 defines communications standards for various networked devices (e.g. Local Area Networks (LAN), Metropolitan Area Networks (MAN), etc.). IEEE 802.11 further defines communications standards for Wireless Local Area Networks (WLAN). As such, communications on these networks must, by agreement, follow one or more communications protocols so that various network devices can communicate. These protocols are not static and are modified (e.g. different generations) over time, typically to improve communications robustness and increase throughput.

In embodiments of a wireless communication network described below, a wireless communications device such as an access point (AP) of a wireless local area network (WLAN) transmits data streams to one or more client stations (STAs). The AP and STAs communicate using one or more communication protocols. These protocols may include IEEE protocols such as: 802.11b; 802.11g; 802.11a; 802.11n [i.e. HT (High Throughput) with Single-User Multiple-Input Multiple-Output (SU-MIMO)]; 802.11ac [i.e. VHT (Very High Throughput) with downlink Multi-User MIMO (MU-MIMO)]; 802.11ax [i.e. HE (High Efficiency) operating at both 2.4- and 5-GHz bands, including OFDMA (Orthogonal Frequency Division Multiple Access) and MU-MIMO with uplink scheduling]; and 802.11be [i.e. EHT (Extra High Throughput) operating at 2.4 GHz, 5 GHz, and 6 GHz frequency bands and a much wider 320 MHz bandwidth]. In various example embodiments, one or more APs may be affiliated into a logical AP group and/or one or more STAs may be affiliated into a logical STA group.

Figure 1:
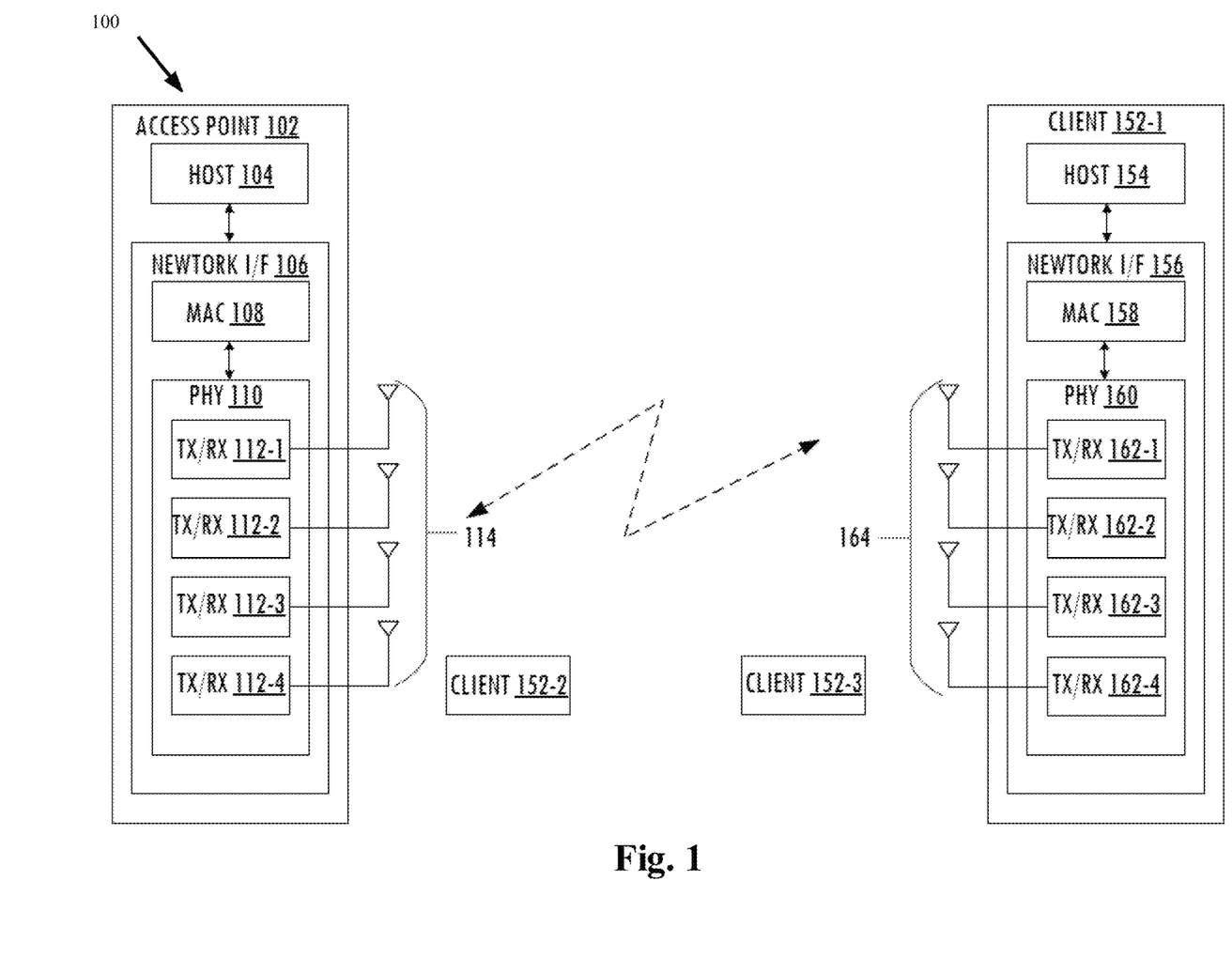
FIG. 1 represents an example wireless communications network (WLAN) formed by a set of wireless communications devices (i.e. APs and STAs).

FIG. 1 represents an example 100 wireless communications network (WLAN) formed by a set of wireless communications devices (i.e. APs and STAs). The WLAN 100 includes access point (AP) 102 and a set of client stations (STAs) 152-1, 152-2, and 152-3.

The AP 102 includes host processor 104 coupled to network interface 106. Host processor 104 includes a processor configured to execute machine readable instructions stored in a memory device (not shown), e.g., random access memory (RAM), read-only memory (ROM), a flash memory, or other storage device.

Network interface 106 includes medium access control (MAC) processor/controller 108 and physical layer (PHY) processor/controller 110. In some example embodiments the MAC processor 108 operates at the data-link layer of the OSI (Open Systems Interconnection) model and the PHY processor 110 operates at the physical layer of the OSI model.

The PHY processor 110 includes a plurality of transceivers 112-1, 112-2, 112-3, and 112-4, each of which is coupled to a corresponding antenna of antennas 114. These antennas 114 can support MIMO functionality. Each of transceivers 112-1, 112-2, 112-3, and 112-4 includes a transmitter signal path and a receiver signal path, e.g., mixed-signal circuits, analog circuits, and digital signal processing circuits for implementing radio frequency and digital baseband functionality. The PHY processor 110 may also include an amplifier (e.g., low noise amplifier or power amplifier), a data converter, and circuits that perform discrete Fourier transform (DFT), inverse discrete Fourier transform (IDFT), modulation, and demodulation, thereby supporting OFDMA modulation.

The client STAs 152-1, 152-2, and 152-3 each include similar circuits (e.g., host processor 154, network interface 156, MAC processor 158, PHY processor 160, transceivers 162-1, 162-2, 162-3, and 162-4, and antennas 164) that provide similar functionality to that of AP 102 but are adapted to client-side specifications.

The MAC 108, 158 and PHY 110, 160 processors within the AP 102 and STA 152-1 exchange PDUs (Protocol Data Units) and SDUs (Service Data Units) in the course of managing the wireless communications traffic. The PHY processor is configured to receive MAC layer SDUs.

While 802.11-baseline Probe Requests/Responses have been used for communication between various APs and STAs, and such devices can use several links simultaneously, these links are independent, which limits their efficiency.

Now discussed are various fields and rules for multi-link setup and operation, which unify the setup procedure with single device and multiple link device, increase data rates and reduce latency. Multi-link operation allows for efficient use of the channel resources and does not suffer from interference in dense deployments. Discussed herein are example embodiments for efficient multi-link setup that reduce a total set of channel state information (i.e. reduce overhead) that would otherwise need to be exchanged to setup multiple links. A set of multi-link information elements (ML IEs) are herein introduced for inclusion in various management frames which can reduce such overhead.

Figure 2:
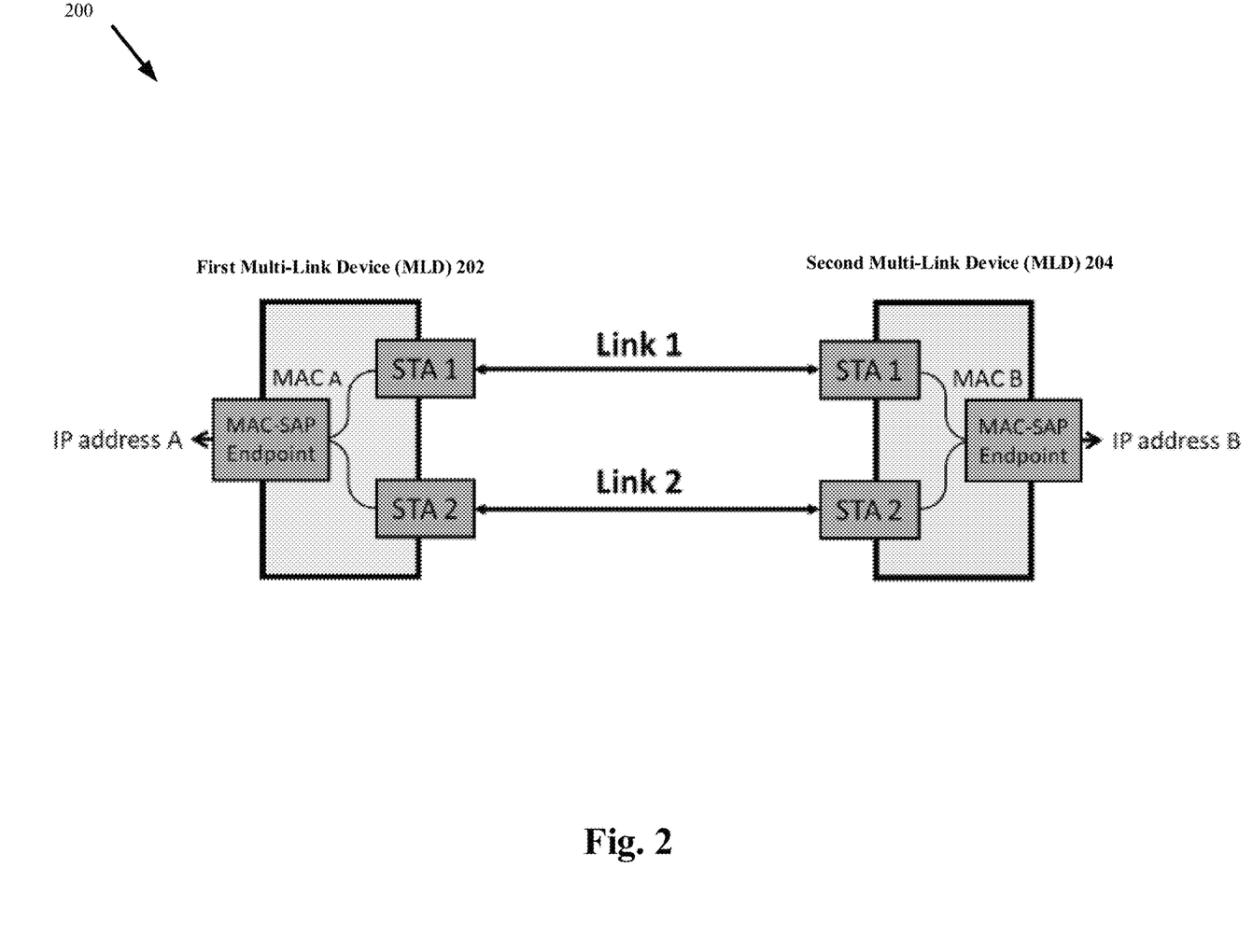
FIG. 2 represents an example topology between a set of multi-link devices (MLDs).

FIG. 2 represents an example 200 topology between a set of multi-link devices (MLDs). The example 200 includes a first multi-link device (MLD) 202 and a second multi-link device (MLD) 204 coupled by a PHY-layer set of links.

The first MLD 202 includes a first affiliated station (STA 1) and a second affiliated station (STA 2). Each affiliated STA includes a separate PHY-layer interface to the wireless media (i.e. Link 1 and Link 2). The affiliated STAs share a single interface to a LLC-layer and thus share a single MAC address (IP address A).

Similarly, the second MLD 204 includes a first affiliated station (STA 1) and a second affiliated station (STA 2). Each affiliated STA includes a separate PHY-layer interface to the wireless media (i.e. Link 1 and Link 2). The affiliated STAs share a single interface to a LLC-layer and thus share a single MAC address (IP address B).

Upper-layer protocols thus consider these sets of affiliated STAs as a single MLD that together form a non-AP-MLD. In other example embodiments the first MLD 202 and/or the second MLD 204 can be affiliated APs (Access Points) that together form an AP-MLD. Throughout this specification the phrases "physical STA" and "physical AP" refer to devices that have a dedicated PHY-layer link, and the phrases "logical non-AP-MLD" and "logical AP-MLD" refer to an affiliated set of "physical STA" or "physical AP" devices that share an MLD IP/MAC address.

During the standardization of IEEE 802.11 TGbe, a concept of multi-link operation (MLO) has been defined. Under MLO, a non-AP MLD can associate with an AP MLD using multi-link setup process.

For a non-AP MLD to perform multi-link (re)setup with an AP MLD, the non-AP MLD and the AP MLD shall exchange (Re)Association Request/Response frames and shall follow MLD (re)association procedure. For example, in the (Re)Association Request frame, the non-AP MLD indicates the links that are requested for (re)setup; and in the (Re)Association Response frame, the AP MLD indicates the links that are accepted for (re)setup.

After successful multi-link (re)setup between a non-AP MLD and an AP MLD, the non-AP MLD and the AP MLD setup PHY-layer links for multi-link operation, and the non-AP MLD is in associated state and is (re)associated with the AP MLD.

For each PHY-layer link setup, the corresponding physical non-AP STA affiliated with the logical non-AP MLD is in a same associated state as the logical non-AP MLD and is associated with the corresponding physical AP affiliated with the physical AP MLD. This is without providing a corresponding physical non-AP STA to the corresponding physical AP mapping to the data frame subset (DS), and enables functionalities between a non-AP STA and its associated AP unless the functionalities have been extended to MLD level and specified otherwise.

IEEE 802.11 TGbe defines basic variant multi-link (ML) elements to be used during multi-link setup. The basic variant is just one type of a ML element. The basic variant includes a much more detailed set of information about the PHY-layer link between two physical devices.

A non-AP MLD may initiate a multi-link setup with an AP MLD to setup more than one link with a subset of APs that are affiliated with the AP MLD. When a non-AP MLD initiates a multi-link setup with an AP MLD, a non-AP STA that is affiliated with the non-AP MLD shall transmit an (Re-)Association Request frame on the link it is operating on. An AP that is affiliated with the AP MLD and that received the (Re-)Association Request frame shall transmit an (Re-)Association Response frame.

The basic variant ML element carried in the (Re-)Association Request frame includes MLD level information that is common to all non-AP STAs affiliated with the non-AP MLD. MLD level information includes at least the MLD MAC address.

The basic variant ML element carried in the (Re-)Association Request frame includes one or more Per-STA profile subelement(s), each of which contains a complete set of information (such as capabilities) of a non-AP STA affiliated with the non-AP MLD and corresponding to a link that is requested for multi-link setup.

The basic variant ML element carried in the (Re-)Association Response frame includes MLD level information that is common to all physical APs affiliated with the logical AP MLD. MLD level information includes at least the MLD's MAC address. The basic variant ML element carried in the (Re-)Association Response frame includes one or more physical STA profile subelement(s), each of which contains a complete set of information (such as capabilities and operational parameters) of a physical AP affiliated with the logical AP MLD and corresponding to a link that is accepted by the AP MLD and requested by the non-AP MLD. Each STA profile subelement included in the basic variant ML element carried in the (Re-)Association Request frame and the (Re-)Association Response frame does not include another basic variant ML element.

In some example MLD association applications, if a non-AP MLD initiates a multi-link setup, then it is possible that an AP MLD is configured to (or capable only of) associating with the non-AP MLD on only a single link. For example, if a non-AP MLD intends to associate with an AP MLD on 2 links (link1 and link2), then the AP MLD might only accept an association on link1 because link2 is dedicated for specific users only. In another example, a non-AP MLD supports 2 links (i.e. link1 and link2), and an AP MLD supports 2 links (i.e. link1 and link3), thus even if the non-AP MLD requests multi-link setup on both link1 and link2, the AP MLD can only accept an association on link1 only.

Thus when a non-AP MLD sends an association Request frame with a basic variant ML element for requesting a multi-link setup with an AP-MLD, and if the AP MLD can only accept association on only one or a subset of the Requested links, then a protocol for the AP-MLD to signal such acceptance to the non-AP-MLD needs to be defined.

Now discussed are example embodiments of Response protocols for an AP-MLD to signal acceptance of only one, or a subset of, a set links Requested by a non-AP-MLD.

FIGS. 3-6 are example set of instructions for enabling a multi-link device (MLD). The order in which the instructions are discussed does not limit the order in which other example embodiments implement the instructions unless otherwise specifically stated. Additionally, in some embodiments the instructions are implemented concurrently.

Figure 3:
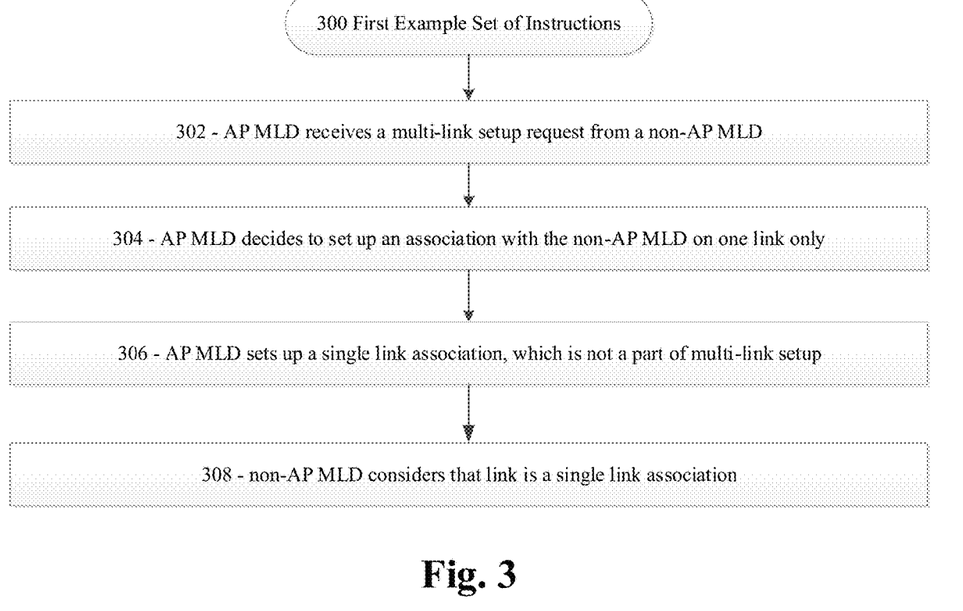
FIG. 3 represents a first example set of instructions for multi-link device (MLD) association.

FIG. 3 represents a first example 300 set of instructions for multi-link device (MLD) association. The first example 300 is a Non-ML setup response to a ML setup request.

In 302, AP MLD receives a multi-link setup request from a non-AP MLD. In 304, the AP MLD decides to set up an association with the non-AP MLD on one link only. In 306, the AP MLD sets up a single link association, which is not a part of multi-link setup. For example, if AP-MLD responds on just one link then is "not multi-link setup". In 308, the non-AP MLD considers that link is a single link association.

In various example embodiments, the ML setup request is requested by the non-AP MLD by transmitting a (Re-)Association Request frame that includes a basic variant ML element; the single link association is set up by the AP MLD by transmitting a (Re-)Association Response frame that does not include a basic variant ML element; and the AP MLD further receives a response frame from the non-AP MLD to the transmission of the (Re-)Association Response frame in determining that the single link association is set up.

Throughout this specification, a basic variant ML element is considered to be included in a (Re-)Association Request/Response frame to indicate multi-link operation (MLO) information. However, the use of "basic" variant (e.g. a complete set of ML elements covering all possible links) is one option of operation and if other variant of ML element is defined or other element is defined to be used to indicate the information of MLO in the (Re-)Association Request/Response frame in IEEE 802.11 standard, the other variant or other element can be used instead without loss of generality.

Figure 4:
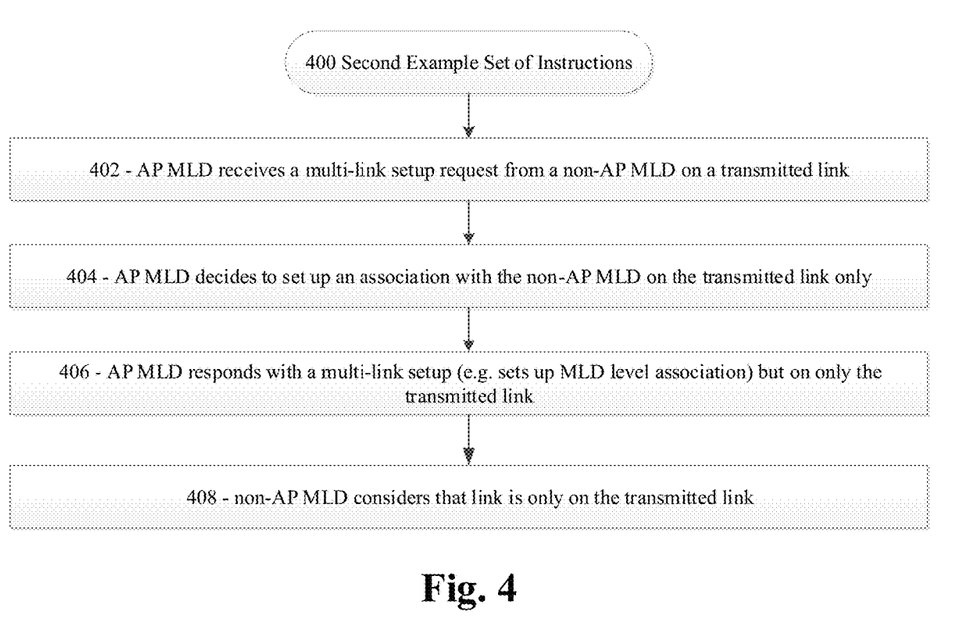
FIG. 4 represents a second example set of instructions for multi-link device (MLD) association.

FIG. 4 represents a second example 400 set of instructions for multi-link device (MLD) association. The second example 400 is a ML setup response for association on a link in ML setup request (i.e. on a transmitted link).

In 402, an AP MLD receives a multi-link setup request from a non-AP MLD on a transmitted link. In 404, the AP MLD decides to set up an association with the non-AP MLD on the transmitted link only. In 406, the AP MLD responds with a multi-link setup (e.g. sets up MLD level association) but on only the transmitted link. In 408, the non-AP MLD considers that link is only on the transmitted link.

In accordance with the above instructions the AP MLD can respond by including a basic variant ML element in the response frame. In some example embodiments, the basic variant ML element included in the (Re-)Association Response frame does not include a Link Info field (i.e. does not include a Per-STA profile subelement). In other example embodiments, the ML element included in the (Re-)Association Response frame includes information on MLD MAC Address, such as by setting a value of a MLD MAC Address Present subfield in the ML element included in the (Re-)Association Response frame to 1.

In some example embodiments, the ML element included in the (Re-)Association Response frame does not include a Link Info field. For example, after a non-AP MLD transmits a (Re-)Association Request frame including a basic variant ML element to an AP MLD on a first link, if the non-AP MLD receives a (Re-)Association Response frame including a basic variant ML element, wherein the basic variant ML element does not include a Link Info field, the non-AP MLD considers that the ML setup is made on the first link only. Note that throughout this specification, "an MLD transmits or receives" implies that a STA affiliated with the MLD transmits or receives.

Figure 5:
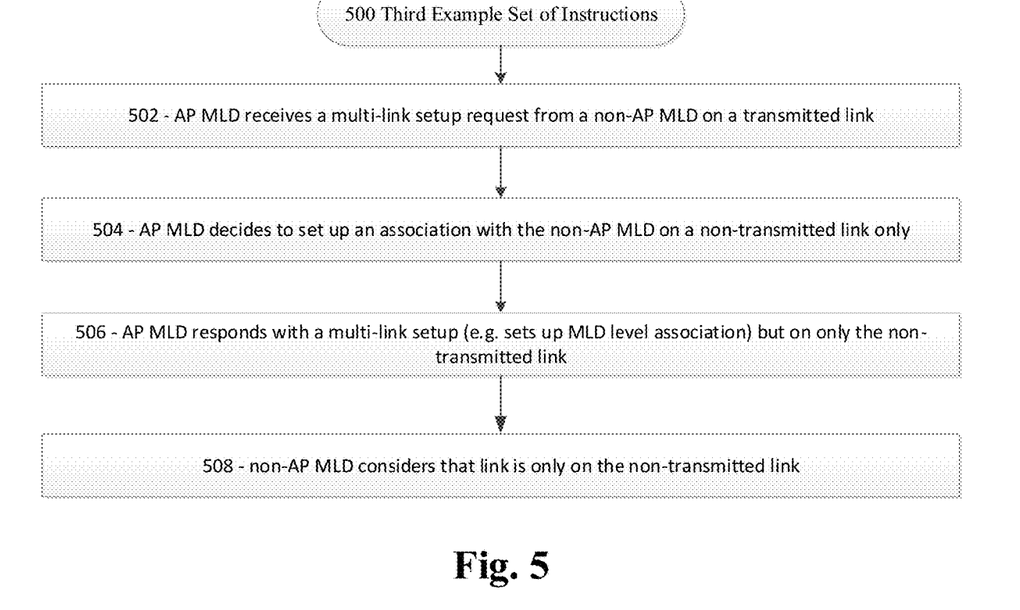
FIG. 5 represents a third example set of instructions for multi-link device (MLD) association.

FIG. 5 represents a third example 500 set of instructions for multi-link device (MLD) association. The third example 500 is a ML setup response for association on a different link than in ML setup request (i.e. on a non-transmitted link).

In 502, an AP MLD receives a multi-link setup request from a non-AP MLD on a transmitted link. In 504, the AP MLD decides to set up an association with the non-AP MLD on a non-transmitted link only. In 506, the AP MLD responds with a multi-link setup (e.g. sets up MLD level association) but on only the non-transmitted link. In 508, the non-AP MLD considers that link is only on the non-transmitted link.

For example, when an AP MLD receives a multi-link setup request from a non-AP MLD by receiving a (Re-)Association Request frame on a first link, if the AP MLD decides to set up an (ML) association with the non-AP MLD on a second link only, the AP MLD responds with a (Re-)Association Response frame, wherein the (Re-)Association Response frame does not include information on the AP-MLD's other link capabilities and/or operational parameters.

In various example embodiments, the (Re-)Association Response frame further includes a basic variant ML element, wherein the basic variant ML element includes a Link Info field (including a Per-STA profile subelement) that corresponds to the second link. In some embodiments, the Link Info field does not include other Per-STA profile subelements that corresponding to links that are different from the second link. After the non-AP MLD transmits the (Re-)Association Request frame, if the non-AP MLD receives a (Re-)Association Response frame that does not include information on capabilities and/or operation parameters of the AP that is affiliated with the AP MLD operating on the first link, the non-AP MLD considers that the ML setup is made on the second link only.

Figure 6:
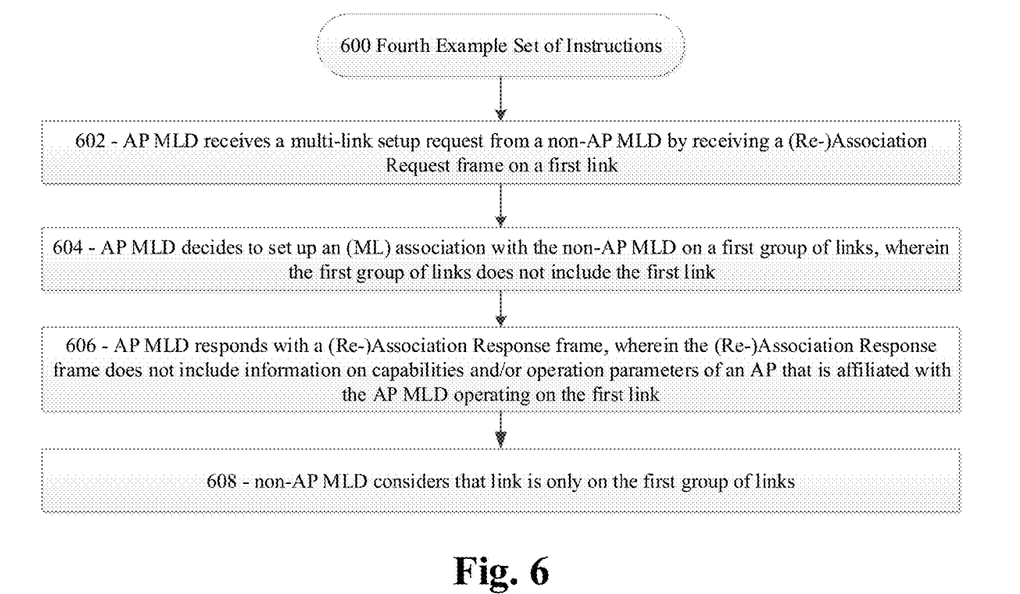
FIG. 6 represents a fourth example set of instructions for multi-link device (MLD) association.

The basic variant ML element may include a common information field. The common info. field can include a MLD MAC address of the AP MLD. The basic variant ML element may also include a capability Information field, a status code field, and an AID field may be included in the (Re-)Association Response frame outside of the basic variant ML element. "Outside" of the basic variant ML element refers to the AP-MLD's other transmit link capabilities;

FIG. 6 represents a fourth example 600 set of instructions for multi-link device (MLD) association. The fourth example 600 is a ML setup response with a different set of links than in the ML setup request.

In 602, the AP MLD receives a multi-link setup request from a non-AP MLD by receiving a (Re-)Association Request frame on a first link. In 604, the AP MLD decides to set up an (ML) association with the non-AP MLD on a first group of links, wherein the first group of links does not include the first link. In 606, the AP MLD responds with a (Re-)Association Response frame, wherein the (Re-)Association Response frame does not include information on capabilities and/or operation parameters of an AP that is affiliated with the AP MLD operating on the first link. In 608, the non-AP MLD considers that link is only on the first group of links.

In various example embodiments, the (Re-)Association Response frame further includes a basic variant ML element, wherein the basic variant ML element includes a Link Info field (including one or more Per-STA profile subelements) that corresponds to the first group of links. After the non-AP MLD transmits the (Re-)Association Request frame, if the non-AP MLD receives a (Re-)Association Response frame that does not include information on capabilities and/or operation parameters of the AP that is affiliated with the AP MLD operating on the first link, the non-AP MLD considers that the ML setup is made excluding the first link. The (Re-)Association Response frame further includes MLD common information outside of the basic variant ML element. A capability information field, status code field, AID field may also be included in the (Re-)Association Response frame outside of the basic variant ML element.

Various instructions and/or operational steps discussed in the above can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A first multi-link device (MLD) within a wireless local area network (WLAN), comprising:
    a controller configured to receive a multi-link setup request for the first MLD to associate with a second MLD on a transmitted link within a first set of PHY-layer links;
    wherein the controller is configured to transmit a response to the second MLD on a non-transmitted link within a second set of PHY-layer links; and
    wherein the response associates the first MLD with the second MLD on the non-transmitted link within the second set of PHY-layer links.

2. The device of claim 1:
    wherein the request is an Association or Reassociation Request frame; and
    wherein the response is an Association or Reassociation Response frame.

3. The device of claim 1:
    wherein the first device is an AP-MLD; and
    wherein the second device is a non-AP-MLD.

4. The device of claim 1:
    wherein the first set of PHY-layer links overlaps with the second set of PHY-layer links; and
    wherein the second MLD considers that link setup is made only on the overlapping PHY-layer links.

5. The device of claim 1:
    wherein the first set of PHY-layer links does not overlap with the second set of PHY-layer links; and
    wherein the second MLD considers that link setup is made only on the second set of PHY-layer links.

6. The device of claim 1:
    wherein the first set of PHY-layer links includes only a single link and the second set of PHY-layer links also includes the single link; and
    wherein the second MLD considers that link setup is made only on the single link.

7. The device of claim 1:
    wherein the first set of PHY-layer links includes a first link and the second set of PHY-layer links includes a second link that is different from the first link; and
    wherein the second MLD considers that link setup is made only on the second link.

8. The device of claim 1:
    wherein the response to the second MLD is a multi-link setup response.

9. The device of claim 8:
    wherein the response includes a basic variant multi-link (ML) element.

10. The device of claim 9:
    wherein the basic variant ML element does not include a Link Info field.

11. The device of claim 9:
    wherein the basic variant ML element does not include a Per-STA profile subelement.

12. The device of claim 9:
    wherein the basic variant ML element includes a common information field.

13. The device of claim 9:
    wherein the basic variant ML element includes an MLD MAC address.

14. The device of claim 9:
    wherein the response includes a capability information field outside of the basic variant ML element.

15. The device of claim 14:
    wherein the capability information field includes a status code field and/or an AID field.

16. The device of claim 1:
    wherein the response to the second MLD is not a multi-link setup response.

17. The device of claim 16:
    wherein the response does not include a basic variant multi-link (ML) element.

18. The device of claim 16:
    wherein the response does not include information on the first MLD's other link capabilities.

19. The device of claim 1:
    wherein the request is from the second MLD.

20. A first multi-link device (MLD) within a wireless local area network (WLAN), comprising:
    a controller configured to receive a multi-link setup request for the first MLD to associate with a second MLD on a first set of PHY-layer links;
    wherein the controller is configured to transmit a response to the second MLD;
    wherein the response associates the first MLD with the second MLD on a second set of PHY-layer links;
    wherein the first set of PHY-layer links includes a first link and the second set of PHY-layer links includes a second link that is different from the first link; and
    wherein the second MLD considers that link setup is made only on the second link.

21. A first multi-link device (MLD) within a wireless local area network (WLAN), comprising:
    a controller configured to receive a multi-link setup request for the first MLD to associate with a second MLD on a first set of PHY-layer links;
    wherein the controller is configured to transmit a response to the second MLD;
    wherein the response associates the first MLD with the second MLD on a second set of PHY-layer links;
    wherein the response to the second MLD is a multi-link setup response;
    wherein the response includes a basic variant multi-link (ML) element; and
    wherein the response includes a capability information field outside of the basic variant ML element.

* * * * *